US012715109B2

(12) United States Patent
Ortyl, III et al.

(10) Patent No.: US 12,715,109 B2
(45) Date of Patent: Aug. 25, 2026

(54) ROBOTIC DIVESTITURE SYSTEM

(71) Applicant: Leidos Security Detection & Automation, Inc., Tewksbury, MA (US)

(72) Inventors: Nicholas Edward Ortyl, III, Bedford, MA (US); Andrew Dean Foland, Wellesley, MA (US)

(73) Assignee: Leidos Security Detection & Automation, Inc., Tewksbury, MA (US)

( * ) Notice: Subject to any disclaimer, the term of this patent is extended or adjusted under 35 U.S.C. 154(b) by 166 days.

(21) Appl. No.: 18/509,995

(22) Filed: Nov. 15, 2023

(65) Prior Publication Data

US 2024/0157543 A1 May 16, 2024

Related U.S. Application Data

(60) Provisional application No. 63/426,003, filed on Nov. 16, 2022.

(51) Int. Cl.
*B25J 5/00* (2006.01)
*B25J 11/00* (2006.01)
*B25J 19/02* (2006.01)

(52) U.S. Cl.
CPC ............. *B25J 5/007* (2013.01); *B25J 11/008* (2013.01); *B25J 19/021* (2013.01)

(58) Field of Classification Search
None
See application file for complete search history.

(56) References Cited

U.S. PATENT DOCUMENTS

2013/0009747 A1 1/2013 Osann, Jr.
2020/0081433 A1 3/2020 Sun et al.
2021/0063564 A1* 3/2021 Vemury ................ H04W 4/029

FOREIGN PATENT DOCUMENTS

CN 105607635 B * 12/2018 ........... G05D 1/0257
EP 3839809 A1 6/2021
(Continued)

OTHER PUBLICATIONS

English translation of CN-105607635-B (wherein the paragraph numbering provided coincides with any relevant citations to this reference within the accompanying Office Action) (Year: 2018).*
(Continued)

*Primary Examiner* — Jason Holloway
*Assistant Examiner* — Bryant Tang
(74) *Attorney, Agent, or Firm* — McCarter & English, LLP

(57) ABSTRACT

A security checkpoint system is provided. The security checkpoint system includes an automated robotic vehicle including a chassis having a bin secured thereto. The security checkpoint system further includes an identification system to associate an individual that has placed an object into the bin with the automated robotic vehicle. The security checkpoint system further includes a scanner to scan the object in the automated robotic vehicle as the automated robotic vehicles passes therethrough. The security checkpoint system further includes a computing device including a processing unit to cause the automated robotic vehicle to navigate to a location of the individual after the automated robotic vehicle has passed through the scanner.

20 Claims, 5 Drawing Sheets

(56) References Cited

FOREIGN PATENT DOCUMENTS

| | | | | |
|---|---|---|---|---|
| WO | 2018/023190 | A1 | 2/2018 | |
| WO | WO-2023149967 | A1 * | 8/2023 | ........... G06Q 50/265 |

OTHER PUBLICATIONS

International Search Report and Written Opinion for Application No. PCT/US2023/079816, dated Mar. 20, 2024, 13 pages.

International Preliminary Report on Patentability for Application No. PCT/US2023/079816, dated May 30, 2025, 7 pages.

* cited by examiner

ROBOTIC DIVESTITURE SYSTEM

CROSS-REFERENCE TO RELATED APPLICATION

This application claims the benefit of U.S. Provisional Patent Application No. 63/426,003, filed on Nov. 16, 2022, and entitled "ROBOTIC DIVESTITURE SYSTEM," the entire contents of which are incorporated by reference herein in their entirety.

BACKGROUND

Non-contact screening is an important tool to detect the presence of contraband or hazardous items being carried by an individual entering a restricted area or transportation hub such as a secure building, an airport, or a train station. Various technologies have been used for non-contact screening including x-ray and millimeter-wave imaging. Such technologies can be used to produce images that reveal hidden objects carried on a person and/or inside bags or other containers carried by the person that are not visible to plain sight. One approach for such screening is a transportation access point such as an airport or train station is to use a series of empty bins picked up by an individual at an input stage of a line and a conveyor system to move the bins into and out of an x-ray system. The individual places items (e.g., bags, keys, phones, shoes, jackets, and/or the like including combinations and/or multiples thereof) into a bin in a process known as divesture. The bin is then inspected by an x-ray system or the like. The individual can collect the item(s) from the bin after inspection. A bin return system returns the bins to replenish bin supply at a divestiture area.

BRIEF SUMMARY

According to an embodiment, a security checkpoint system is provided. The security checkpoint system includes an automated robotic vehicle including a chassis having a bin secured thereto. The security checkpoint system further includes an identification system to associate an individual that has placed an object into the bin with the automated robotic vehicle. The security checkpoint system further includes a scanner to scan the object in the automated robotic vehicle as the automated robotic vehicles passes therethrough. The security checkpoint system further includes a computing device including a processing unit to cause the automated robotic vehicle to navigate to a location of the individual after the automated robotic vehicle has passed through the scanner.

According to another embodiment, a method for operating an automated robotic vehicle is provided. The method includes causing the automated robotic vehicle to navigate to a divestiture station, the automated robotic vehicle comprising a bin and a chassis to which the bin is secured. The method further includes, responsive to an individual placing an object in the bin of the automated robotic vehicle, associating the automated robotic vehicle with the individual. The method further includes causing, based at least in part on a movement of the individual, the automated robotic vehicle to navigate through a scanner to scan the object in the bin of the automated robotic vehicle as the automated robotic vehicle passes through the scanner. The method further includes causing, based at least in part on a result of the scan of the object, the automated robotic vehicle to navigate to one of an enhanced security location for additional screening or a collection area for the individual to collect the object from the bin of the automated robotic vehicle.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
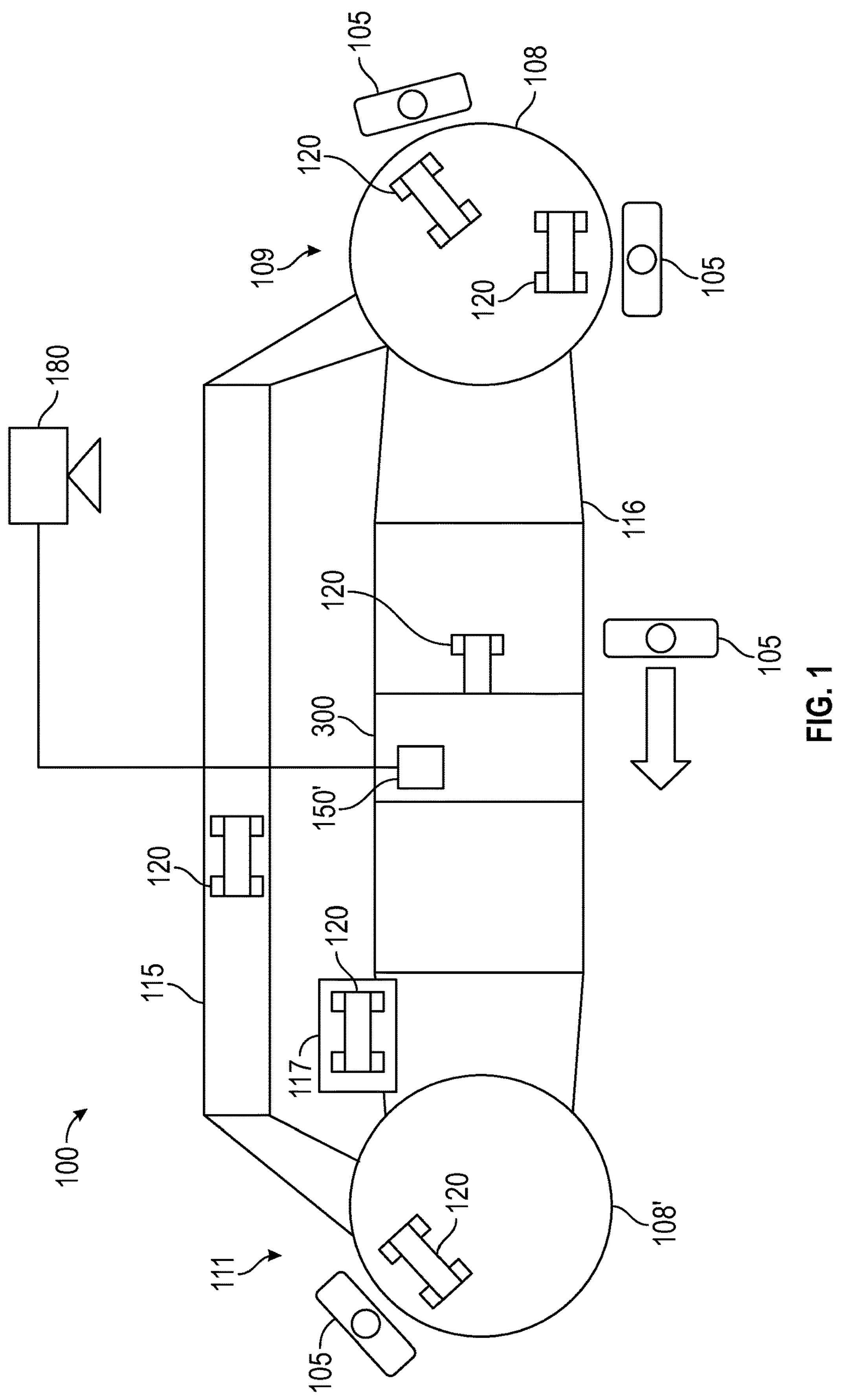
FIG. 1 schematically illustrates an overhead view of a robotic divestiture system in accordance with some embodiments taught herein.

Described in detail herein are robotic divestiture systems and methods for use thereof.

One approach for screening belongings, such as carry-on baggage, at a transportation access point such as an airport or train station is to use a series of empty bins picked up by an individual at an input stage of a line (e.g., a divestiture area) and a conveyor system to move the bins into and out of an x-ray system. A bin return system returns the bins to replenish the input stage of the line. Often, conveyor systems can be around 60 feet (about 18.3 meters) to 100 feet (about 30.5 meters) long, which can be a disadvantage as such systems can exceed the size of small areas and can tie up a large amount of otherwise usable space in a busy transportation hub. Additionally, conveyor systems can cost on the order of $100,000 to $200,000. Further, conveyor systems separate individuals from their belongings such that screening of the individual and the screening of the individual's belongings becomes decoupled. For example, the individual and the belongings can pass through the checkpoint at different speeds or one of the individual or belongings can be subjected to further security scrutiny (e.g., enhanced screening) while the other passes through security without incident. The consequences of decoupling the screening of the individual and screening of the belongings include that the belongings can accidently be left unattended or that individuals become frustrated when they are not able to locate their belongings after screening. As used herein, "belongings" refers to one or more items associated with an individual. Non-limiting examples of belongings include a bag, a toolbox, an article of clothing (e.g., a jacket, a hat, shoes, etc.), a tool, a computing device (e.g., a laptop, a smartphone, etc.), a container, and/or the like including combinations and/or multiples thereof.

The robotic divestiture systems and method taught herein overcome these problems. For example, according to one or more embodiments, a total length of the system can be reduced to around 30 feet (around 9.1 meters), which results in a significant reduction in the area of the transportation hub that is occupied by security screening as compared to existing systems. In some embodiments, the cost to implement the system can be significantly less than existing systems. Further, the modular nature of the robotic bins means that maintenance and replacement of robotic bins is inexpensive and can be done at a separate location while the system continues to operate. Further, the robotic bins can follow the individual through the screening process and be associated with a particular individual by the system to avoid decoupling an individual from his or her belongings. For example, the robotic bins can move the individual's belongings through the x-ray system and then locate and approach the individual on the cleared side of the checkpoint (e.g., after the individual is screened). This avoids individual frustration and avoids cases where bad actors may attempt to take belongings that does not belong to them. These and other advantages are possible.

FIG. 1 schematically illustrates an overhead view of a robotic divestiture system 100 in accordance with some embodiments taught herein. The robotic divestiture system 100 includes one or more robotic bins 120 (also referred to as "automated robotic vehicles"). A robotic bin is a device that can move autonomously and has a means for receiving one or more belongings such that the robotic bin can transport the one or more belongings. The robotic bins 120 can be placed at tables 108, 108' (e.g., infeed and outfeed tables respectively) for access by individuals (e.g., individuals 105). An individual 105 at the table 108 can load the individual's luggage, goods, or belongings onto or into the robotic bin 120 as part of a divestiture process, where the table 108 is located at a divestiture station 109. The robotic bin 120 can then transport the luggage, goods, or belongings along a main pathway 116 through a scanner 300 in communication with a computing device, for example, a computing device 150'. The scanner 300 can be any suitable type of scanner for screening belongings and the like, such as an x-ray scanner, a computed tomography scanner, ion mobility mass spectrometry, vapor detection, or millimeter-wave scanner. Based upon the result of screening, the robotic bin 120 can then locate and approach the individual 105 on the cleared side of the checkpoint, for example, at the table 108' or can move the luggage to an enhanced security location 117 for additional screening. According to one or more embodiments described herein, the individual can be presented with instructions at the divestiture station 109 to instruct the individual how to perform the divestiture. For example, instructions can be in the form of text (e.g., signs), audio (e.g., pre-recorded audio messages), video (e.g., pre-recorded video messages), and/or the like including combinations and/or multiples thereof. According to one or more embodiments described herein, a conversational security related appliance can be implemented for providing instructions to the user. The conversational security related appliance provides for generating objective-specific answers to security related questions at or near the security checkpoint.

According to an embodiment, a robotic bin 120 can be built from proprietary components, commercially available components, or a combination of proprietary and commercially available components. As an example, a robotic bin 120 can include one or more of the following components: a controller, one or more wheels, a direct current (DC) motor to drive the wheels and being controllable by the controller, one or more sensors to send data to the controller, and one or more communications interfaces. The controller can be, for example, a Raspberry Pi, Arduino, Nvidia Jetson Nano, and/or the like including combinations and/or multiples thereof. According to one or more embodiments described herein, an example of the controller is the computing device 150, which is described in more detail herein. The wheels can be Mecanum wheels and/or the like. The DC motor can be a Seeed Technology motor, an Adafruit Industries motor, and/or the like including combinations and/or multiples thereof. In some cases, the DC motor includes or is connected to a gear box, such as those used for robots and radio controlled vehicles. The one or more sensors can include infrared sensors, ultrasonic sensors, vision sensors (e.g., cameras), and/or the like including combinations and/or multiples thereof, such as those made by Adafruit Industries, Raspberry Pi, Makeblock, and others. The one or more communications interfaces can be any suitable interface for communicating with another device, such as the computing device 150'. The one or more communications interfaces can support WiFi, Bluetooth, cellular, radio frequency, infrared, and/or any other suitable communications protocol. According to one or more embodiments described herein, the one or more communications interfaces can be integrated into the controller, such as in the case of a Raspberry Pi or Arduino controller, and/or can be a stand-along module, such as those provided by Murata, DFRobot, and others. The robotic bin 120 can include additional components, such as a chassis(s), a bin(s), programming, printed circuit board(s), cabling, mechanical connectors, electrical connectors, and/or the like including combinations and/or multiples thereof.

In some embodiments, the robotic divestiture system 100 can include an identification system 180, such as a camera system. The identification system 180 can sense which robotic bin 120 is carrying the belongings of a particular individual 105 and associate the robotic bin 120 with that individual 105 in a memory of the computing device 150'. For example, the identification system 180 can acquire images of individuals using cameras or optical detectors and apply image analysis or processing techniques to associate a unique identifier with each individual. More particularly, the identification system 180 can process an image and associate a unique identifier with an individual based on distinguishing characteristics (e.g., features) of the individual. It should be appreciated that, although an image can be captured of an individual, the individual need not be identified in terms of determining who the individual is, such as the individual's name, etc. The identification system 180 can also sense the identity of a particular robotic bin 120 that was used by the identified individual. For example, the identification system 180 can include an indoor ranging system, radio-frequency identification (RFID) scanners, or optical systems that detect the identity of the particular robotic bin 120 (i.e., an RFID, barcode, QR code, numerical identifier, and/or the like including combinations and/or multiples thereof) or track the robotic identity using imaging or ranging techniques. For example, the identification system 180 can capture an image of a robotic bin and can perform image analysis or processing techniques to identify the robotic bin 120 based on features or characteristics of the robotic bin 120 (e.g., a number printed on the robotic bin 120, a barcode printed on the robotic bin 120, etc.). According to one or more embodiments described herein, the identification system 180 can use timestamps associated with images captured of an individual and an associated robotic bin 120 to associate the individual and the robotic bin 120. According to one or more embodiments described herein, an individual can be associated with one robotic bin 120 or multiple robotic bins 120. For example, if the individual has more belongings or items than can fit in one robotic bin 120, the individual can use multiple robotic bins 120, and the identification system 180 can associate each of the multiple robotic bins 120 with the individual. According to one or more embodiments described herein, an RFID reader, barcode reader, or the like can be used to identify belongings of the individual 105 without a camera-based system. For example, the individual 105 can enter his or her belongings into a system to check whether the belongings are authorized, for example using an RFID reader, barcode reader, and/or the like including combinations and/or multiples thereof. The belongings can have an associated RFID tag, barcode, QR code, etc., which can be used to determine whether the belongings are authorized.

In embodiments with multiple robotic bins 120, the robotic bins can auto-arrange among themselves to smoothly move each robotic bin 120 through the scanner 300 and avoid crashing into each other or the scanner 300. In some embodiments, the robotic bins 120 communicate with the computing device 150'. Through the identification system 180, the computing device 150' knows the location of the robotic bins 120 in relation to other elements of the robotic divestiture system 100 and in relation to one another. A queueing module 466 of the computing device 150' (see FIG. 3) can determine an order in which loaded robotic bins 120 should proceed through the scanner 300. For example, the queuing module 466 can order the robotic bins 120 based on an order of screening of individuals associated with the robotic bins 120. For example, a robotic bin 120 can be queued to be first to be screened by the scanner 300 responsive to determining that an individual associated with that robotic bin 120 is next to be screened by a body scanner. As another example, if an individual associated with a robotic bin 120 is delayed (e.g., selected for additional screening), the robotic bin 120 associated with that individual may be moved to a later place in the queue for screening belongings. The computing device 150' sends navigation commands to individual robotic bins 120 based upon the order determined by the queueing module 466.

Figure 2:
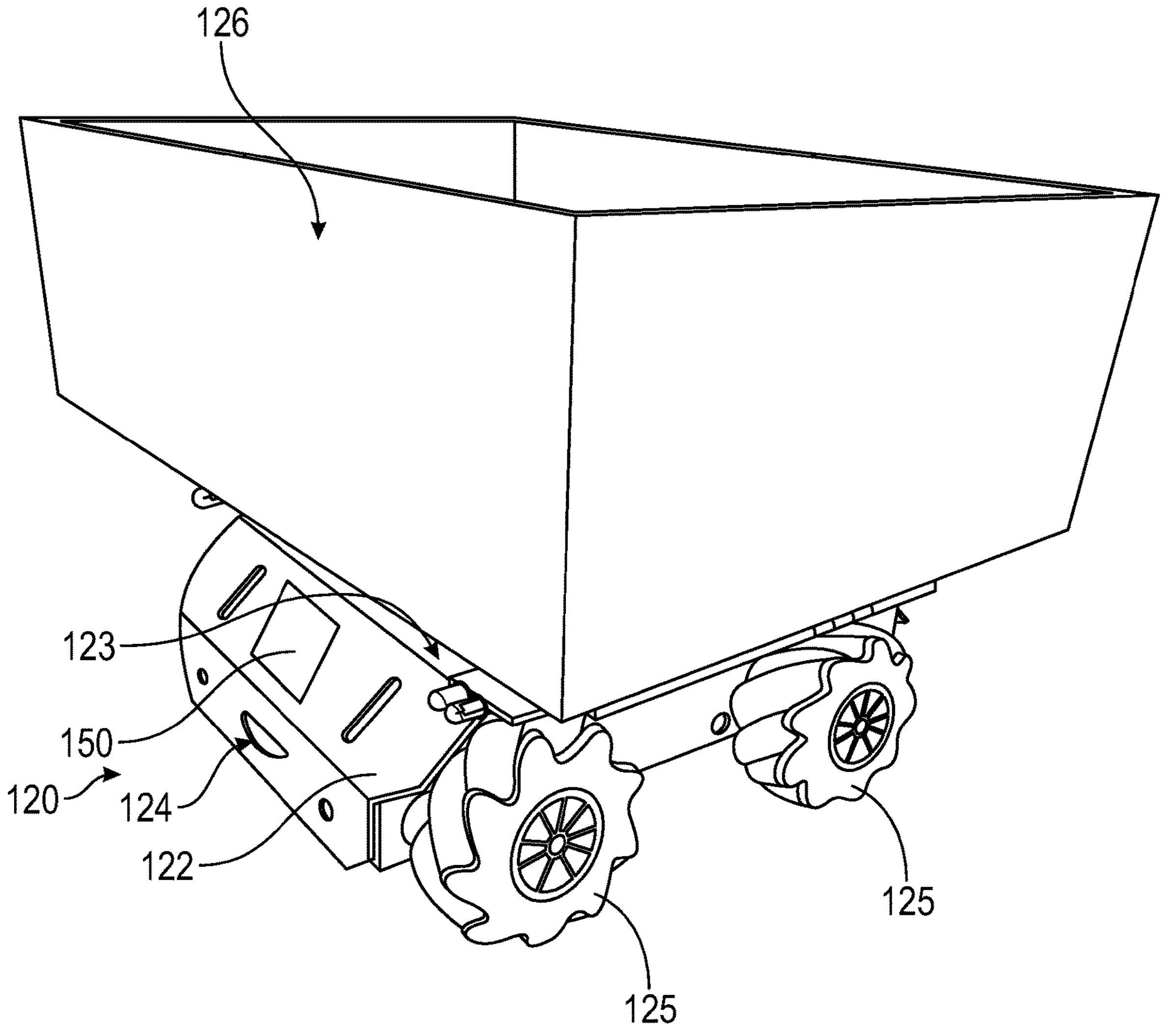
FIG. 2 illustrates an example robotic bin for use within a robotic divestiture system in accordance with some embodiments taught herein.

In some embodiments, each robotic bin 120 includes one or more sensors 124 (as shown in FIG. 2) that communicate sensing signals to a computing device 150 on board the robotic bin 120 to enable the robotic bin 120 to sense the presence of other robotic bins 120 in the area. The one or more sensors 124 aid the robotic bin 120 in avoiding obstacles (e.g., one another, the scanner 300, and/or the like including combinations and/or multiples thereof). In the event that the robotic bin senses that an obstacle (such as another robotic bin 120, an edge, or a wall) is or will be in the robotic bin's path, the computing device 150 can halt motion and/or modify a direction or speed of travel of the robotic bin 120 to avoid a collision. In some embodiments, the one or more sensor 124 can include imaging sensors, infrared sensors, limit switches to detect physical contact, radar, Lidar, GPS or ultrasound sensors to provide situational or location awareness. In some embodiments, the robotic bin 120 can use ultrasound sensors while navigating through the scanner 300 to enable the robotic bin 120 to determine a location within a scanner housing of the scanner 300. In some embodiments, the robotic bin 120 can use location-based information to navigate. For example, in some embodiments, the robotic bin 120 can use GPS information, markers, infrared beams, lasers, beams on the floor or inside the scanner 300, and/or the like including combinations and/or multiples thereof, to enable the robotic bin 120 to determine a location within a scanner housing of the scanner 300. The computing device 150 can use the sensed location information to determine whether or where to stop within the scanner 300 or to determine speed within the scanner 300 to improve computed tomography imaging (e.g., by slowing down or by stopping at a central point within the scanner 300).

Before the individual approaches the table 108, the robotic bins 120 can be placed into or can self-arrange into an organized pattern and/or a predetermined pattern in various embodiments. In other embodiments, the robotic bins 120 can be randomly distributed atop the tables 108, 108'. In some embodiments, a number of robotic bins in a range between 12 and 24 robotic bins can be accessible as part of the robotic divestiture system 100, although other numbers of robotic bins are also possible. In some embodiments, the tables 108, 108' can be round or can include rounded portions such that the individuals 105 can nominally reach a center of the tables 108, 108'. By enabling the individuals 105 to reach the center of the tables 108, 108', the likelihood is increased that the individual 105 is able to access at least one robotic bin 120 upon arrival at the table 108. In some embodiments, the tables 108, 108' can be the same shape or can be different shapes. In some embodiments, the tables 108, 108' can be a shape other than round. In some embodiments, the tables 108, 108' can be made of stainless steel or another suitable material.

It should be appreciated that in other embodiments, the robotic bins 120 can of a suitable size to operate on a floor of a screening area or other non-elevated environment. That is, the robotic bins 120 can be sized such that the robotic bins 120 can travel along the floor of the screening area without being on an elevated surface (e.g., the tables 108, 108', the main pathway 116, etc.) such that a bin 126 (see FIG. 2). In such an arrangement, the robotic bins 120 of a suitable height to enable an individual to access the robotic bins 120 without bending or reaching.

As the robotic bin 120 exits the scanner 300 along the main pathway 116, the computing device 150' determines whether the belongings scanned by the scanner 300 has been cleared or has been flagged for enhanced screening. Being "cleared" indicates that the scanner 300 did not identify any contraband, hazardous materials, or any other non-authorized items. Being "flagged for enhanced screening" indicates that the scanner 300 identified contraband, hazardous materials, or some other non-authorized item(s), or that results of the scan were inconclusive. In such cases, further evaluation, such as by a human operator, or a re-scan by the scanner 300 may be performed as part of the enhanced screening. In the event that enhanced screening is to be performed, the computing device 150' can send navigation commands or notify the computing device 150 of the robotic bin 120 to execute a navigation module 460 to cause the robotic bin 120 to proceed to the enhanced screening location 117. In the event that the belongings are cleared, the computing device 150' can send navigation commands or notify the computing device 150 of the robotic bin 120 to execute the navigation module 460 to proceed to the table 108' at a collection area 111 for the individual to collect his or her belongings from the robotic bin 120. In some embodiments, the robotic bin 120 can proceed to a predetermined location near an edge of the table 108 to await individual unloading of the belongings at the collection area 111. In some embodiments, the computing device 150' can use the identification system 180 to locate the individual on the cleared side of the checkpoint that is associated with the particular robotic bin 120 that has cleared screening. Then, the computing device 150' can cause the robotic bin 120 to navigate to the location at the table 108' where the individual is located. In some embodiments, the computing device 150' may not be able to locate the individual associated with the particular robotic bin 120. This may occur if the individual has been taken aside for enhanced screening or if belongings processing is proceeding more quickly than individual screening, for example. In such a case, the computing device 150' may cause the robotic bin 120 to navigate to a holding area away from any individual to await further instructions. The holding area can be an enhanced screening location 117 in some embodiments. The computing device 150' can continue to observe individuals using the identification system 180 until the individual that is associated with the particular robotic bin 120 is identified. The computing device 150' can then cause the robotic bin to navigate to the location of the associated individual. In some embodiments, the robotic divestiture system 100 can recognize when a person who is not the individual associated the bin (i.e., an unauthorized or unexpected user) removes objects or items from the bin 120. In some embodiments, the robotic divestiture system 100 can show an alert to a system operator if such a person removes items from the bin 120.

After the individual 105 has removed their belongings from the robotic bin 120 at the table 108' of the collection area 111 on the cleared side of the scanner 300, the robotic bin 120 can navigate upon the return path 115 to return to the table 108 in preparation to carry another individual's belongings through the scanner 300. The return path 115 can be a table that runs at least partially parallel and adjacent to the main pathway 116 in some embodiments. In some embodiments, the return path 115 runs above or below the main pathway 116 and above or underneath the scanner 300. According to one or more embodiments described herein, the return path 115 is the same as the main pathway 116 such that a separate return path is omitted. That is, the robotic bins 120 can shuttle back and forth through the scanner 300 along the main pathway 116.

In some embodiments, the main pathway 116, the return pathway 117, or both can be free of a conveyor belt or roller assembly. By removing the conveyor belt or roller assembly, a robotic bin 120 can pass through the scanner 120 at a constant or variable velocity. Because the robotic bins 120 are self-driving, the surfaces of the main and return pathway do not have to include moving elements. By avoiding the use of a conveyor belt as used in existing systems, the robotic divestiture system 100 can improve safety, reduce maintenance costs, and reduce costs.

FIG. 2 illustrates an example of the robotic bin 120 (e.g., an automated robotic vehicle) for use within a robotic divestiture system (e.g., the robotic divestiture system 100) in accordance with some embodiments taught herein. The robotic bin 120 can include a chassis 122 having a loading surface 123. A bin 126 can be permanently or removably secured to the loading surface 123 of the chassis 122 using, for example, rivets, bolts, hook-and-loop fasteners, adhesive, or other fixation means known in the art. According to one or more embodiments described herein, the bin 126 can be integrally formed with the chassis 122. Means for locomotion such as wheels 125 are coupled to the chassis to enable the robotic bin 120 to move. In some embodiments, the wheels 125 are omnidirectional wheels that can roll forward, but slide sideways with almost no friction to avoid skidding during turns. The wheels 125 can be turned while the robotic bin 120 stays substantially stationary to allow changes in heading of the robotic bin in small spaces. In embodiments that use omnidirectional wheels, the position of the bin 126 stays stationary atop the chassis 122. Holding the position of the bin 126 stationary can improve imaging results during scanning by the scanner 300 as the objects in the bin that are being scanned do not veer to one direction or the other while passing through the scanner 300, but stay on a constant path with respect to a computed tomography x-ray gantry. In another example, continuous tracks can be used to move the robotic bin 120. For example, a robotic bin 120 can include two continuous tracks arranged on opposite sides of the robotic bin 120, which can be powered (e.g., using one or more motors connected to the wheels) to drive the robotic bin 120 along a particular path and/or to a particular location.

The robotic bin 120 includes one or more of the sensors 124 and the computing device 150. The computing device 150 of the robotic bin 120 can use a communications interface to communicate directly with other robotic bins 120 or with the computing device 150' to send and receive information such as location information, heading information, or velocity information of the robotic bin 120 or other robotic bins 120. According to one or more embodiments described herein, a robotic bin 120 can alter its velocity including while in the scanner, which aids in scanning belongings in the robotic bin 120, such as where unwanted objects or substances are identified and inspected in more detail. In some embodiments, the one or more sensors 124 on the robotic bin can include optical detectors to acquire images of the individual that is using the bin 120 to enable the robotic bin 120 to associate the individual with the robotic bin 120.

The computing device 150 can include a navigation module 460 and a communications interface 462 in some embodiments. The navigation module 460 can control direction and speed of the wheels 125 (e.g., using one or more motors connected to the wheels) to drive the robotic bin 120 along a particular path and/or to a particular location. In some embodiments, the navigation module 460 is located in the computing device 150' and communicates navigation commands to the one or more robotic bins 120 from a communications interface 154 of the computing device 150' to the communications interface 462 of the robotic bin 120.

In some embodiments, one or more components of the robotic bin 120 can be shielded from x-ray radiation or can use materials that are radiation hardened. Shielding provides the advantage that electronic components within the robotic bin 120 are not affected by radiation and that the internal structure of the robotic bin 120 is prevented from appearing in reconstructed images that result from the x-ray scanning process. In some embodiments, the scanner 300 can employ machine learning or artificial intelligence to recognize the structure of the robotic bin 120 and eliminate this structure from the resulting reconstructed images of objects in the bin 126.

Figure 3:
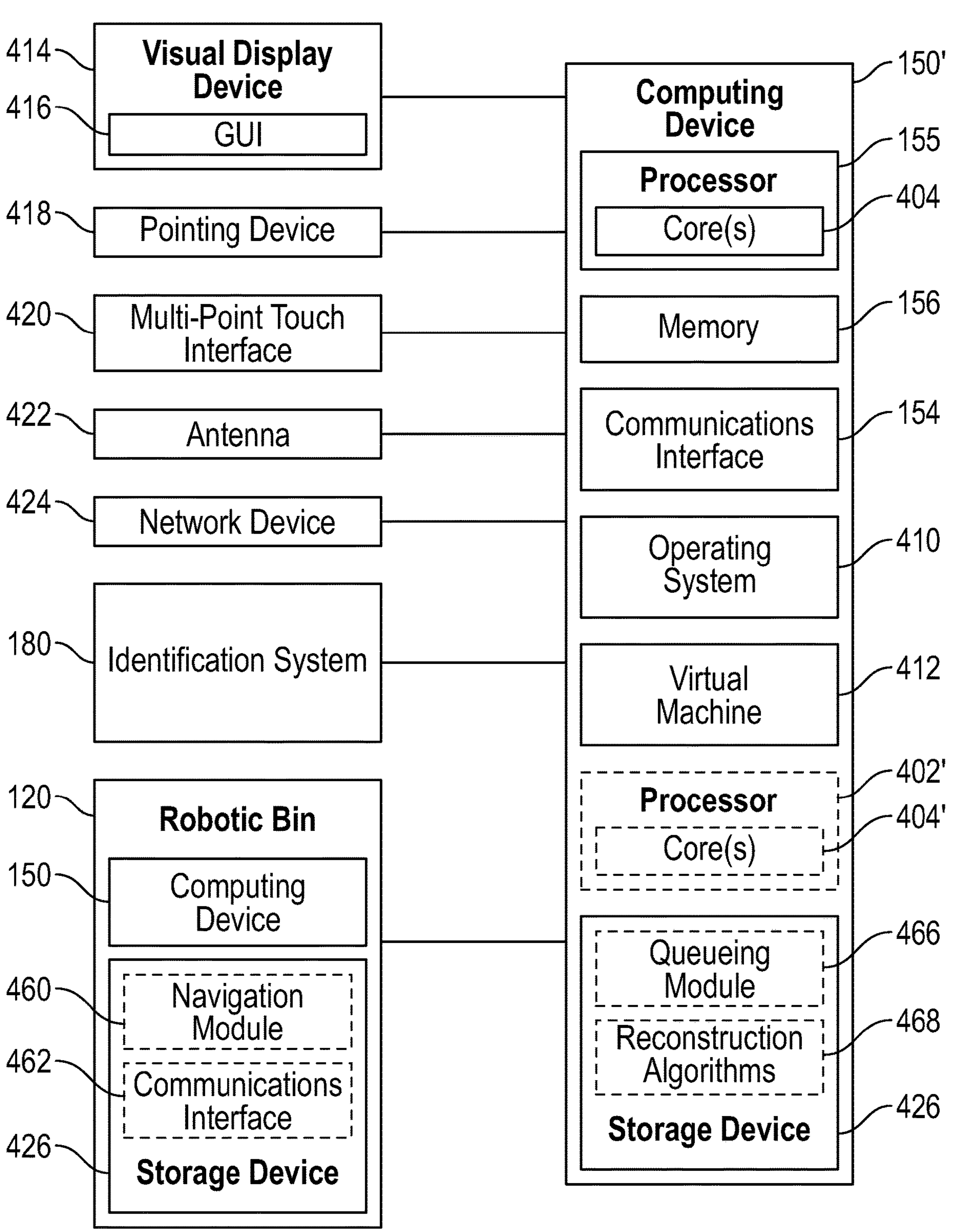
FIG. 3 is a block diagram of a computing device suitable for use with embodiments of the present disclosure.

FIG. 3 is a block diagram of the computing device 150' suitable for use with embodiments of the present disclosure. The computing device 150' may be, but is not limited to, a smartphone, laptop, tablet, desktop computer, microcontroller (e.g., Arduino), system on a chip (e.g., RasPi), server, or network appliance. The computing device 150' includes one or more non-transitory computer-readable media for storing one or more computer-executable instructions or software for implementing the various embodiments taught herein. The non-transitory computer-readable media may include, but are not limited to, one or more types of hardware memory (e.g., memory 156), non-transitory tangible media (for example, storage device 426, one or more magnetic storage disks, one or more optical disks, one or more flash drives, one or more solid state disks), and the like. For example, memory 156 included in the computing device 150' may store computer-readable and computer-executable instructions or software such as the queueing module 466 or the navigation module 460 for implementing operations of the computing device 150'. The computing device 150' also includes configurable and/or programmable processor 155 and associated core(s) 404, and in some embodiments, one or more additional configurable and/or programmable processor(s) 402' and associated core(s) 404' (for example, in the case of computer systems having multiple processors/cores), for executing computer-readable and computer-executable instructions or software stored in the memory 156 and other programs for implementing embodiments of the present disclosure. Processor 155 and processor(s) 402' may each be a single core processor or multiple core (404 and 404') processor. Either or both of processor 155 and processor(s) 402' may be configured to execute one or more of the instructions described in connection with computing device 150'. According to one or more embodiments described herein, the computing system 150' can include a graphics processing unit (GPU) module (e.g., Nvidia jetson nano).

Virtualization may be employed in the computing device 150' so that infrastructure and resources in the computing device 150' may be shared dynamically. A virtual machine 412 may be provided to handle a process running on multiple processors so that the process appears to be using only one computing resource rather than multiple computing resources. Multiple virtual machines may also be used with one processor.

Memory 156 may include a computer system memory or random access memory, such as DRAM, SRAM, EDO RAM, and the like. Memory 156 may include other types of memory as well, or combinations thereof.

A user may interact with the computing device 150' through a visual display device 414, such as a computer monitor, which may display one or more graphical user interfaces 416. The user may interact with the computing device 150' using a multi-point touch interface 420 or a pointing device 418.

The computing device 150' may also include one or more computer storage devices 426, such as a hard-drive, CD-ROM, or other computer readable media, for storing data and computer-readable instructions, modules 466, 460 and/or software that implement exemplary embodiments of the present disclosure (e.g., applications). For example, exemplary storage device 426 can include the navigation module 460 or queueing module 466. The storage device 426 can also include reconstruction algorithms 468 that can be applied to imaging data and/or other data to reconstruct images of scanned objects.

The computing device 150' can include a communications interface 154 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing device 150' can include one or more antennas 422 to facilitate wireless communication (e.g., via the network interface) between the computing device 150' and a network and/or between the computing device 150' and components of the system such as the identification system 180 or robotic bins 120. The communications interface 154 may include a built-in network adapter, network interface card, PCMCIA network card, card bus network adapter, wireless network adapter, USB network adapter, modem or any other device suitable for interfacing the computing device 150' to any type of network capable of communication and performing the operations described herein.

The computing device 150' may run an operating system 410, such as versions of the Microsoft® Windows® operating systems, different releases of the Unix® and Linux® operating systems, versions of the MacOS® for Macintosh computers, embedded operating systems, real-time operating systems, open source operating systems, proprietary operating systems, or other operating system capable of running on the computing device 150' and performing the operations described herein. In exemplary embodiments, the operating system 410 may be run in native mode or emulated mode. In an exemplary embodiment, the operating system 410 may be run on one or more cloud machine instances.

Figure 4:
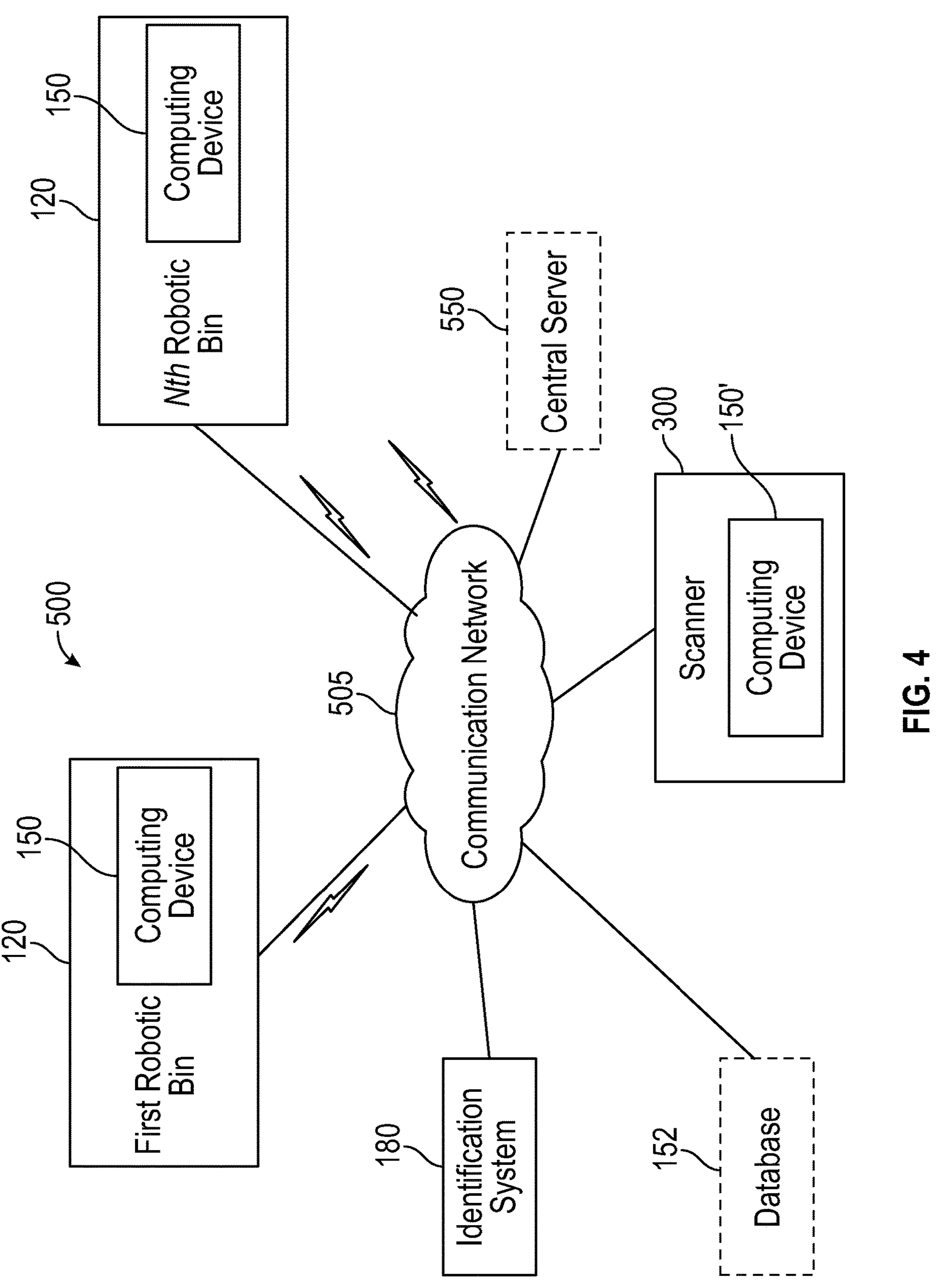
FIG. 4 schematically illustrates a network environment for use with the systems and methods of some embodiments taught herein.

FIG. 4 illustrates a network environment 500 including the computing device 150' and other elements of the systems described herein that is suitable for use with exemplary embodiments. The network environment 500 can include the identification system 180, first through nth robotic bins 120 that each include the computing device 150, one or more databases 152, and the scanner 300 including computing device 150' that can communicate with one another via a communications network 505. While the computing device 150' has been described heretofore as a component of the scanner 300, some embodiments of the robotic divestiture system 100 and network environment 500 can include a standalone central server 550 that communications with the other elements in the robotic divestiture system 100 using the communications network 505. The central server 550 is an example of the computing device 150'.

The computing device 150' can host one or more applications (e.g., navigation modules 460 or queuing modules 466 and any mechanical, motive, or electronic systems associated with these system aspects; reconstruction algorithms 462; or graphical user interfaces 416) configured to interact with one or more components of the robotic divestiture system 100 and/or to facilitate access to the content of databases. The databases 152 may store information or data including instructions or software modules (i.e., navigation 460 or queueing 466), reconstruction algorithms 462, or imaging data as described above. Information from the databases 152 can be retrieved by the computing device 150' through the network 505 during an imaging or scanning operation. The databases 152 can be located at one or more geographically distributed locations away from some or all system components and/or the computing device 150'. Alternatively, the databases 152 can be located at the same geographical location as the computing device 150' and/or at the same geographical location as the system components. The computing device 150' can be geographically distant from the scanner 300 or other system components. For example, the computing device 150' and operator can be located in a secured room sequestered from the location where the scanning of individuals or belongings takes place to alleviate privacy concerns. The computing device 150' can also be located entirely off-site in a remote facility.

In an example embodiment, one or more portions of the communications network 505 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMAX network, an Internet-of-Things (IoT) network established using BlueTooth® or any other protocol, any other type of network, or a combination of two or more such networks.

Figure 5:
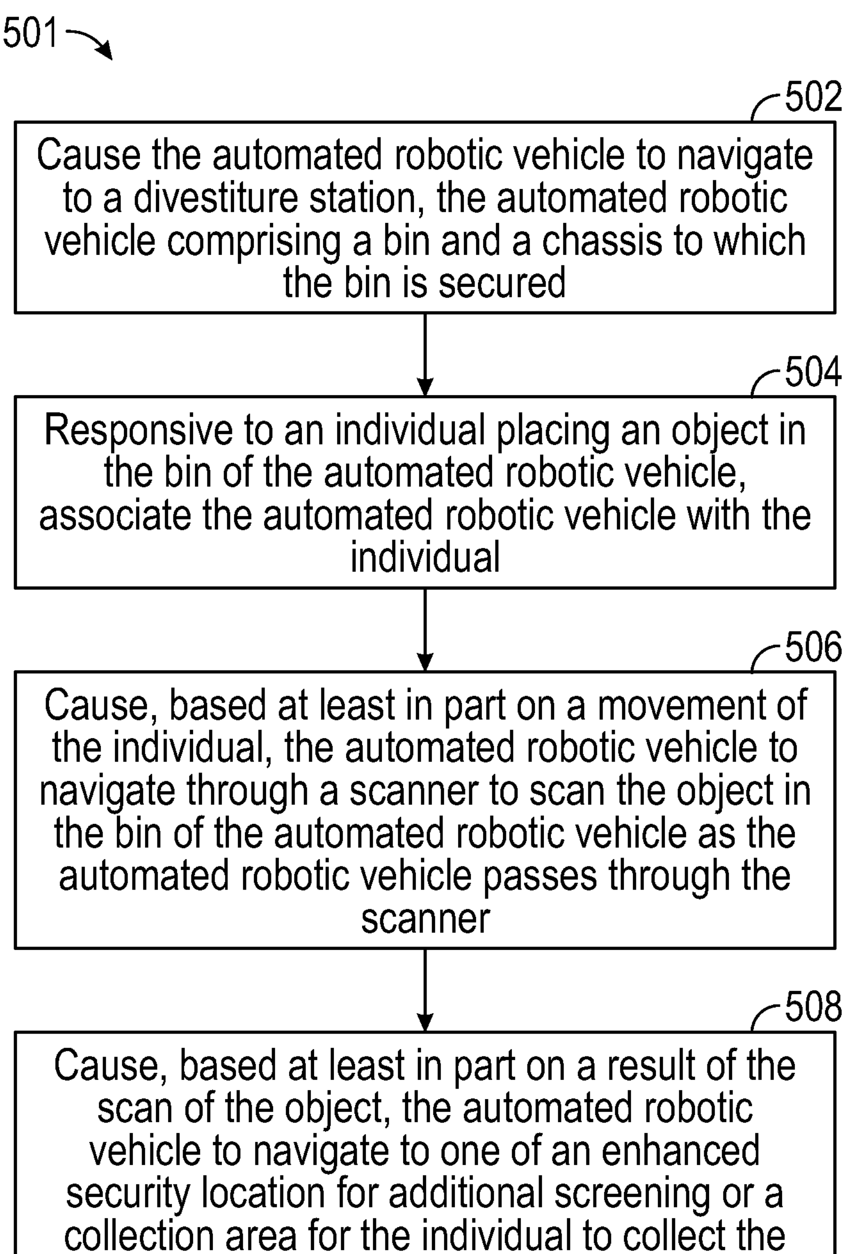
FIG. 5 depicts a flow diagram of a method for operating an automated robotic vehicle according to one or more embodiments described herein.

FIG. 5 depicts a flow diagram of a method 501 for operating an automated robotic vehicle according to one or more embodiments described herein. At block 502, the automated robotic vehicle is caused to navigate to a divestiture station. For example, the computing device 150' and/or the computing device 150, using the navigation module 460, can cause the robotic bin 120 (e.g., an automated robotic vehicle) to navigate to the divestiture station 109. The automated robotic vehicle includes the bin 126 and the chassis 122 to which the bin 126 is secured.

At block 504, responsive to an individual placing an object in the bin of the automated robotic vehicle, the automated robotic vehicle is associated with the individual. For example, the identification system 180 and/or the one or more sensors 124 can be used to associate the individual 105 with one or more of the robotic bin 120.

At block 506, based at least in part on a movement of the individual, the automated robotic vehicle navigates into the scanner 300 to scan the object in the robotic bin 120. In some embodiments, the robotic bin 120 stops in the scanner for the scanning process and once the scanning process is complete moves toward the egress of the scanner. In some embodiments, the robotic bin 120 continues to move during the scanning process towards the egress of the scanner. Once the robotic bin 120 exits the scanner 300, the identification system 180 and/or the one or more sensors 124 can be used to track the movement of the individual 105, and the movement of the individual 105 is used to determine how to move the robotic bin 120. For example, if the individual 105 is delayed from passing through a body scanner (not shown), the robotic bin 120 may be moved to a holding area before passing through the scanner 300. As another example, if the individual 105 is selected for enhanced screening, the robotic bin 120 may be moved to the enhanced security location 117 or another holding area.

At block 508, based at least in part on a result of the scan of the object place in the robotic bin 120, the robotic bin 120 navigates to one of an enhanced security location for additional screening or a collection area for the individual to collect the object from the robotic bin 120. For example, if the objected is “cleared,” the robotic bin 120 navigates to the table 108' at the collection area 111 where the individual 105 may retrieve his or her belongings (e.g., baggage) from the robotic bin 120. As another example, if the object is “flagged for enhanced screening,” the robotic bin 120 navigates to the enhanced security location 117 for further evaluation.

According to one or more embodiments described herein, if an unauthorized individual (e.g., an individual other than the individual associated with the automated robotic vehicle) attempts to collect an object from the bin of the automated robotic vehicle, an alert can be issued, such as to a human operator (e.g., a security officer).

According to one or more embodiments described herein, after the individual collects his or her object from the bin of the automated robotic vehicle, the automated robotic vehicle can navigate back to the divestiture station 109 automatically.

Additional processes also may be included, and it should be understood that the processes depicted in FIG. 5 represent illustrations, and that other processes may be added or existing processes may be removed, modified, or rearranged without departing from the scope and spirit of the present disclosure. It should also be understood that the processes depicted in FIG. 5 may be implemented as programmatic instructions stored on a non-transitory computer-readable storage medium that, when executed by a processor (e.g., the processor 155) of a computing system (e.g., the central server 555), cause the processor to perform the processes described herein.

In describing example embodiments, specific terminology is used for the sake of clarity. Additionally, in some instances where a particular example embodiment includes multiple system elements, device components or method steps, those elements, components or steps may be replaced with a single element, component, or step. Likewise, a single element, component, or step may be replaced with multiple elements, components, or steps that serve the same purpose. Moreover, while example embodiments have been illustrated and described with references to particular embodiments thereof, those of ordinary skill in the art will understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A security checkpoint system, comprising:

an automated robotic vehicle including a chassis having a bin secured thereto and a sensor configured to locate an individual associated with the automated robotic vehicle;

an identification system configured to associate the individual with the automated robotic vehicle based on data from the sensor and the individual having placed an object into the bin;

a scanner to scan the object in the automated robotic vehicle as the automated robotic vehicles passes therethrough; and a computing device including a processing unit configured to:

determine a result of the scan of the object, determine a location of the individual from communications with the identification system or from communications with the automated robotic vehicle; and based on the result, cause the automated robotic vehicle to navigate to the location of the individual after the automated robotic vehicle has passed through the scanner.

2. The security checkpoint system of claim 1, wherein the chassis of the automated robotic vehicle comprises a loading surface, and the bin is secured to the loading surface of the chassis.

3. The security checkpoint system of claim 2, wherein the bin is removably secured to the loading surface of the chassis.

4. The security checkpoint system of claim 2, wherein the bin is permanently secured to the loading surface of the chassis.

5. The security checkpoint system of claim 1, wherein the sensor comprises an optical detector to acquire an image of the individual, the image of the individual being used to associate the automated robotic vehicle with the individual.

6. The security checkpoint system of claim 1, wherein the automated robotic vehicle comprises a communications interface to communicate with at least one of another robotic bin and the computing device.

7. The security checkpoint system of claim 6, wherein the communications interface is used to transmit and receive location information, heading information, and velocity information.

8. The security checkpoint system of claim 1, wherein the automated robotic vehicle comprises wheels coupled to the chassis.

9. The security checkpoint system of claim 8, wherein the wheels are omnidirectional wheels.

10. The security checkpoint system of claim 1, wherein the location is an enhanced security location for additional screening of the object.

11. The security checkpoint system of claim 1, wherein the location is a collection area for the individual to collect the object from the bin of the automated robotic vehicle.

12. A method for operating an automated robotic vehicle, the method comprising:

causing the automated robotic vehicle to navigate to a divestiture station, the automated robotic vehicle comprising a bin, a chassis to which the bin is secured, and a sensor configured to locate an individual associated with the automated robotic vehicle;

responsive to an individual placing an object in the bin of the automated robotic vehicle, associating the automated robotic vehicle with the individual based on data from the sensor;

causing, based at least in part on a movement of the individual, the automated robotic vehicle to navigate through a scanner to scan the object in the bin of the automated robotic vehicle as the automated robotic vehicle passes through the scanner; and causing, based at least in part on a result of the scan of the object, the automated robotic vehicle to navigate to the location of the individual to collect the object from the bin of the automated robotic vehicle.

13. The method of claim 12, further comprising, responsive to identifying an unauthorized individual attempting to collect the object from the bin of the automated robotic vehicle, issuing an alert, where the unauthorized individual is other than the individual associated with the automated robotic vehicle.

14. The method of claim 12, further comprising, responsive to the individual collecting the object from the bin of the automated robotic vehicle, causing the automated robotic vehicle to navigate back to the divestiture station.

15. The method of claim 12, wherein the chassis comprises a loading surface, wherein the bin is secured to the loading surface, wherein the bin is configured to receive the object from the individual.

16. The method of claim 12, wherein the automated robotic vehicle comprises wheels to move the automated robotic vehicle.

17. The method of claim 12, wherein the automated robotic vehicle comprises a sensor for associating the automated robotic vehicle with the individual.

18. The method of claim 12, wherein the automated robotic vehicle comprises a communications interface to communicate with at least one of another robotic bin and a computing device.

19. The method of claim 12, wherein the automated robotic vehicle comprises a navigation module to navigate the automated robotic vehicle, wherein the navigation module causes the automated robotic vehicle to change velocity.

20. The security checkpoint system of claim 1, wherein the scanner is an x-ray scanner and wherein the automated robotic vehicle is adapted to withstand x-ray radiation.

* * * * *